United States Patent [19]
Beckmann et al.

[11] Patent Number: 6,163,753
[45] Date of Patent: *Dec. 19, 2000

[54] RADIO NAVIGATION EMULATING GPS SYSTEM

[75] Inventors: Martin Beckmann; Charles M. Gunderson, both of Austin, Tex.

[73] Assignee: Trimble Navigation Limited, Suunyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/186,777

[22] Filed: Nov. 4, 1998

Related U.S. Application Data

[63] Continuation of application No. 08/665,318, Jun. 17, 1996.

[51] Int. Cl.[7] .................................................. G01C 21/00
[52] U.S. Cl. .................. 701/213; 701/214; 395/500.44; 73/178 R; 342/46; 342/49
[58] Field of Search ...................... 701/200, 213, 701/217, 215, 218, 214; 73/178 R; 395/500; 342/385, 399, 401, 404, 407, 46, 47, 49

[56] References Cited

U.S. PATENT DOCUMENTS

| | | | |
|---|---|---|---|
| 4,583,177 | 4/1986 | Meyer | 701/218 |
| 4,651,282 | 3/1987 | Robinson et al. | 701/200 |
| 4,674,051 | 6/1987 | Fischer | 701/200 |
| 4,692,869 | 9/1987 | King et al. | 364/448 |
| 4,891,760 | 1/1990 | Kashiwazaki et al. | 73/178 R |
| 5,216,611 | 6/1993 | McElreath | 364/454 |
| 5,270,936 | 12/1993 | Fukushima et al. | 701/213 |
| 5,420,795 | 5/1995 | Greene | 701/200 |
| 5,422,814 | 6/1995 | Sprague et al. | 701/213 |
| 5,740,048 | 4/1998 | Abel et al. | 701/200 |

*Primary Examiner*—William A. Cuchlinski, Jr.
*Assistant Examiner*—Yonel Beaulieu
*Attorney, Agent, or Firm*—Wagner, Murabito & Hao LLP

[57] ABSTRACT

The present invention provides a radio navigation emulating GPS device. In one embodiment, the radio navigation emulating GPS device receives an identifier associated with a conventional radio navaid. The present radio navigation emulating GPS device then retrieves latitude and longitude information corresponding to the received conventional radio navaid from a database. A satellite based position information system generates position information for the aircraft on which the present radio navigation emulating GPS device is disposed. The present radio navigation emulating GPS device then generates navigation information for the aircraft using the retrieved latitude and longitude information and the satellite based position information for the aircraft. The present radio navigation emulating GPS device then presents the navigation information in a manner which emulates the presentation of navigation information generated by a conventional radio navigation device. The entire emulation process is transparent to the user of the present radio navigation emulating GPS device.

26 Claims, 7 Drawing Sheets

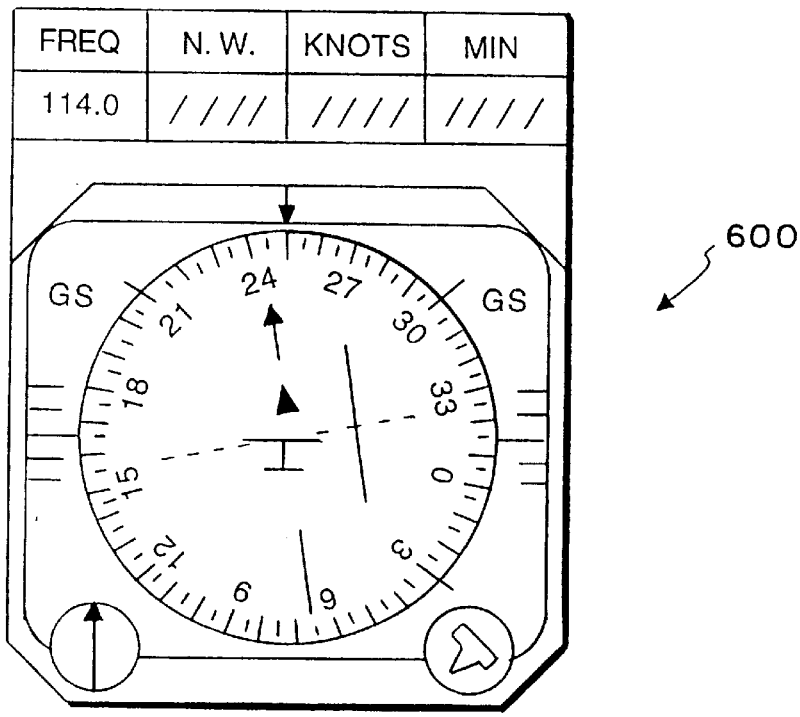
FIG. 6
FIG. 7
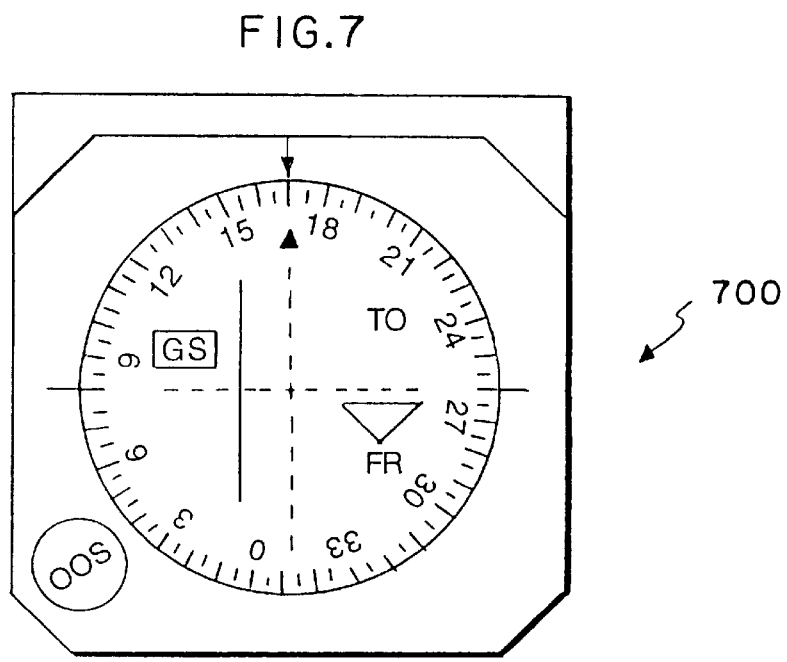

RADIO NAVIGATION EMULATING GPS SYSTEM

This is a continuation of copending application Ser. No. 08/665,318 filed on Jun. 17, 1996 which is hereby incorporated by reference to this specification which designated the U.S.

TECHNICAL FIELD

The present relates to navigation aids. In particular, the present invention pertains to aviation navigation aids.

BACKGROUND ART

For the past 40 years, air navigation has primarily consisted of various forms of radio direction finding devices. With these devices, navigation information is transmitted from a fixed ground station and received by airborne aircraft equipped with the appropriate receivers. Each ground transmitter has a unique radio frequency associated therewith. To navigate an aircraft, the pilot dials or tunes a receiver to the frequency associated with the ground based transmitter, and then flies the aircraft towards the transmitter. Once the pilot reaches the transmitter, the pilot tunes in the frequency of the next transmitter along the pilot's chosen route. Identifiers for the ground transmitters are typically displayed to the pilot as TO navaids and FROM navaids. An identifier for the ground transmitter towards which the aircraft is heading is marked as the TO waypoint or navaid. Similarly, the last ground transmitter from which the aircraft is heading is marked as the FROM waypoint or navaid. Thus, prior art radio navigation systems require the pilot to tune a receiver to a particular frequency and to then fly the aircraft from transmitter to transmitter. Common radio navigation transmission systems used by the pilot community include VORs, DMEs, TACANs, and NDBs.

VOR is an acronym for very high frequency omnidirectional range. It is the Federal Aviation Administration's (FAA's) very high frequency (VHF) based point-to-point navigation system. VOR consists of a ground station transmitter and an airborne VOR receiver. The ground transmitter transmits phase encoded signals outward from the transmitter in all directions. The airborne receiver receives the transmitted VOR signal and decodes the phase information to determine the aircraft's bearing with respect to the ground transmitter. The aircraft's bearing is referred as being on a particular "radial" from the VOR transmitter. Radial information is commonly displayed on a course deviation indicator (CDI) gauge or on a radio magnetic indicator (RMI) gauge. VOR is a line of sight transmission system. As a result, VOR range is typically limited to 130 nautical miles at best due to the curvature of the earth. However, other obstructions can further limit the range of conventional VOR systems. Additionally, intrinsic VOR system errors contribute substantial error to VOR readings. At a maximum range from the VOR transmitter, errors of as much as 20 nautical miles are possible.

DME is an acronym for distance measuring equipment. DME is an active system requiring receivers and transmitters at both the ground station and in the airborne aircraft. A DME system is initiated by the airborne unit sending ultra high frequency (UHF) pulses to the ground station and the ground station sending responding UHF pulses back to the airborne unit's receiver. The airborne unit measures the time interval between the initial transmission and receipt of the responding message. The measured time is used to calculate the distance of the aircraft from the DME station. Typically, DME stations are co-located with VOR stations in a VOR/DME station. As with VOR stations DME systems also suffer from significant error. Furthermore, due to the interactive nature of DME systems, DME stations can become overloaded in congested airspace environments.

TACAN is an acronym for tactical air navigation. TACAN is the military counterpart to combination VOR/DME stations. TACAN operation is very similar to VOR/DME operation, where the pilot receives both direction and range indications on the aircraft instrument gauges. TACAN, like other radio navigation systems, has error associated therewith. In fact, TACAN accuracy is only slightly better than VOR/DME.

NDB is the acronym for non-directional radio beacons. Although NDBs are typically not used for general air navigation in the continental United States, NDBs are still used in many less developed regions of the world. Thus, NDBs remain an important part of instrument approaches for many pilots. Pilots typically use NDBs as compass locators to aid in finding the initial approach point of an instrument landing system. NDBs are also used for non-precision approaches at low-traffic density airports without conventional VOR approaches. In a NDB system, the direction, or bearing, of the aircraft with respect to the transmitting ground station is generally displayed on a compass card gauge by means of a pointer. An NDB systems is not as accurate as a VOR system. Additionally, NDB radio signals are subject to many propagational and atmospheric degradations which further reduce the accuracy of the NDB system. Hence existing radio navigation systems have considerable errors and inaccuracies associated therewith.

In addition to being familiar with certain radio navigation systems, pilots have been extensively trained on certain radio navigation instrumentation devices. As a result of their initial training and ongoing use of such radio navigation devices, many pilots resist using new navigation systems and/or new navigation instrumentation devices. Thus, even though conventional radio navigation systems may have errors and inaccuracies associated therewith many pilots are reluctant to give up familiar instrumentation devices.

As yet another drawback, in a radio navigation system, a pilot navigates the aircraft along a route which extends from one radio transmitter to another radio transmitter and so on, until the aircraft reaches the desired location. As a result pilots are often forced to travel along a circuitous route to reach a desired destination. Prior Art FIG. 1 is an example of an airway navigation en route chart. On the chart, airways are represented as lines between stations 100. For example, to fly from Helena 102 to Jackson 104 using the airway system, a pilot would fly from Helena 102 to Whitehall 104 via airway V21 106. The pilot would then fly the aircraft from Whitehall 104 to Dillon 108 via V21 110. Next the pilot would fly from Dillon 108 to Dubois 112 via V21 114. Finally, the pilot would fly from Dubois 112 to Jackson 116 via V298 118.

In an attempt to overcome shortcomings associated with radio navigation systems, a navigation system employing the Global Positioning System (GPS) had been introduced. The use of a GPS based aircraft navigation system is intended to eliminate the circuitous navaid to navaid scheme used in radio navigation systems, and improve navigation accuracy. GPS based navigation systems allow a pilot to fly from a point of origin directly to a destination. Thus, GPS systems eliminate circuitous navaid to navaid routing schemes of radio navigation systems.

However, the conventional radio navigation airway system has been in operation since the late 1940s. As a result, there are literally hundreds of thousands of pilots who were trained in radio navigation using standardized radio navigation instrumentation devices. The user interface in radio navigation equipment, due both to the length of time the equipment has been in use and the widespread standardization of the display configuration, is basically the same now as it was 30 years ago. Hence, there is great reluctance in the pilot community to use new GPS based navigation aids.

Additionally, aircraft built by different manufacturers have contained standardized radio navigation equipment. Therefore, pilots could easily switch from an aircraft built by one manufacturer into an aircraft built by another manufacturer. With GPS navigation receivers, different units built by different manufacturers are to varying degrees, unique. That is, each manufacturer has its own special control/display arrangements. Thus, in order to effectively use these GPS products, the pilot must have knowledge of nested menus, numerous buttons and knobs, and various new functions. Therefore, the pilot must learn a completely new operating system in order effectively use present GPS based navigation devices.

Also, in order to safely use the GPS navaids, extensive training is often required to master the myriad of informational display techniques and control inputs/outputs. Almost none of this training investment is transferable to other GPS navaids, since each manufacturer follows his own protocols and configurations when designing their systems. Training necessary to safely and. properly operate these new GPS navaids is highly specialized and is very expensive. Furthermore, very few flight instructors in the general aviation community have experience with the newer models of GPS navaids. In addition, most general aviation pilots have previously learned to think of navigation in terms of radial and distance when navigating with radio navigation based equipment. To use GPS, pilots must learn to think in terms of latitude and longitude map coordinates. Thus, current GPS navigation products from avionics manufacturers are often difficult to use in the actual inflight environment. As a result, a very significant safety issue arises when attempting to transition pilots from conventional radio navigation to GPS based navigation.

Thus, a need has arisen for a navigation device which eliminates the errors associated with radio navigation systems and provides GPS level accuracy. A further need exists for uniform and standardized navigation instrumentation for use with a navigation system providing GPS level accuracy. Yet another need exists for navigation instrumentation which operates with GPS level accuracy and which the pilot community will not be reluctant to adopt.

DISCLOSURE OF THE INVENTION

The present invention provides a navigation device which eliminates the3 errors associated with radio navigation systems and provides GPS level accuracy; the present invention provides uniform and standardized navigation instrumentation for use with a navigation system providing GPS level accuracy; and the present invention provides navigation instrumentation which operates with GPS level accuracy and which the pilot community will not be reluctant to adopt.

The present invention comprises a radio-navaid emulating GPS navigation system. More specifically, in one embodiment, the present invention includes a position determining system which accurately determines the position of an aircraft. The position determining system is a GPS based position determining system in the present embodiment. The present embodiment also includes a data storage device which is adapted to contain latitude and longitude information corresponding to radio navaid locations and the like. In the present embodiment, a processor is coupled to the position determining system. The processor calculates position and navigation information using data from the data storage device and the location information determined by the GPS based position determining system. In the present invention, a radio navaid emulating user interface then reports the position and navigation information to the pilot. In so doing, the present invention provides navigation information with GPS level accuracy in a well known and widely accepted radio navigation user interface. Thus, the present invention allows pilots to fully utilize the features and advantages of GPS navigation without requiring the pilot to spend an inordinate amount of time learning a new navigation system. The emulation process of the present invention is transparent to the pilot, as the pilot operates the present invention as though it was a conventional, and much less accurate, radio navigation based navaid.

In one embodiment, the pilot enters a desired navaid into the present radio navigation emulating GPS system by tuning or entering into the present system the frequency or three letter identifier associated with the navaid. Such entries are typically made when the pilot is planning the flight route. The present invention then accesses stored information to find the precise lat-long of the navaid whose frequency or three letter identifier the user selected. Thus, although the pilot tunes or selects a ground based transmitter when using the present invention, the pilot is actually selecting a virtual station. That is, instead of actually tuning in the frequency entered by the pilot, the present invention determines the lat-long information of the selected navaid. Therefore, the pilot operates the controls of the present invention in the same manner as a pilot would operate a radio navigation device. As a result, to the pilot, the present invention appears to be functioning the same as a radio navigation system functions. In the present embodiment, a display of the present invention will also display the letters identifying the station having the selected frequency. Additionally, the present embodiment also displays the lat-long of the selected navaid. The present invention uses the position information of the aircraft to calculate the bearing to the selected navaid from the present location of the aircraft. The bearing pointer will indicate exact bearing to the navaid selected by the pilot. Thus, the present invention calculates the bearing from the precise lat-long of the aircraft to the precise lat-long of selected navaid. Thus, the present invention provides satellite based accuracy levels in what appears to the pilot to be a radio navigation system. As yet another advantage, the present invention does not have the inherent range limitations associated with prior art radio navigation systems. That is, the present invention compares the lat-long of the navaid with the lat-long of the aircraft to indicate the bearing from the aircraft to the navaid. The present invention eliminates the need to receive radio signals from the navaid before a bearing can be calculated. Hence, the present invention is not limited by the radio signal range of a navaid. Therefore, the range of the present invention is not limited. Therefore, the present invention can accurately provide a bearing from the aircraft to a navaid located well beyond the range of radio signals. Consequently, the present invention provides direct routing over an unlimited distance. Thus, the benefit of direct routing will be retained in a system which appears to the pilot to be a radio navigation based system. All of the aforementioned benefits are realized without requiring re-training of the pilot.

Other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with. the description, serve to explain the principles of the invention:

FIG. 6 is an illustration of a CDI gauge which is driven by a radio-navaid emulating GPS navigation system in accordance with the present claimed invention.

FIG. 7 is an illustration of a combination CDI/HSI gauge which is driven by a radio-navaid emulating GPS navigation system in accordance with the present claimed invention.

BEST MODE FOR CARRYING OUT THE INVENTION

Figure 1:
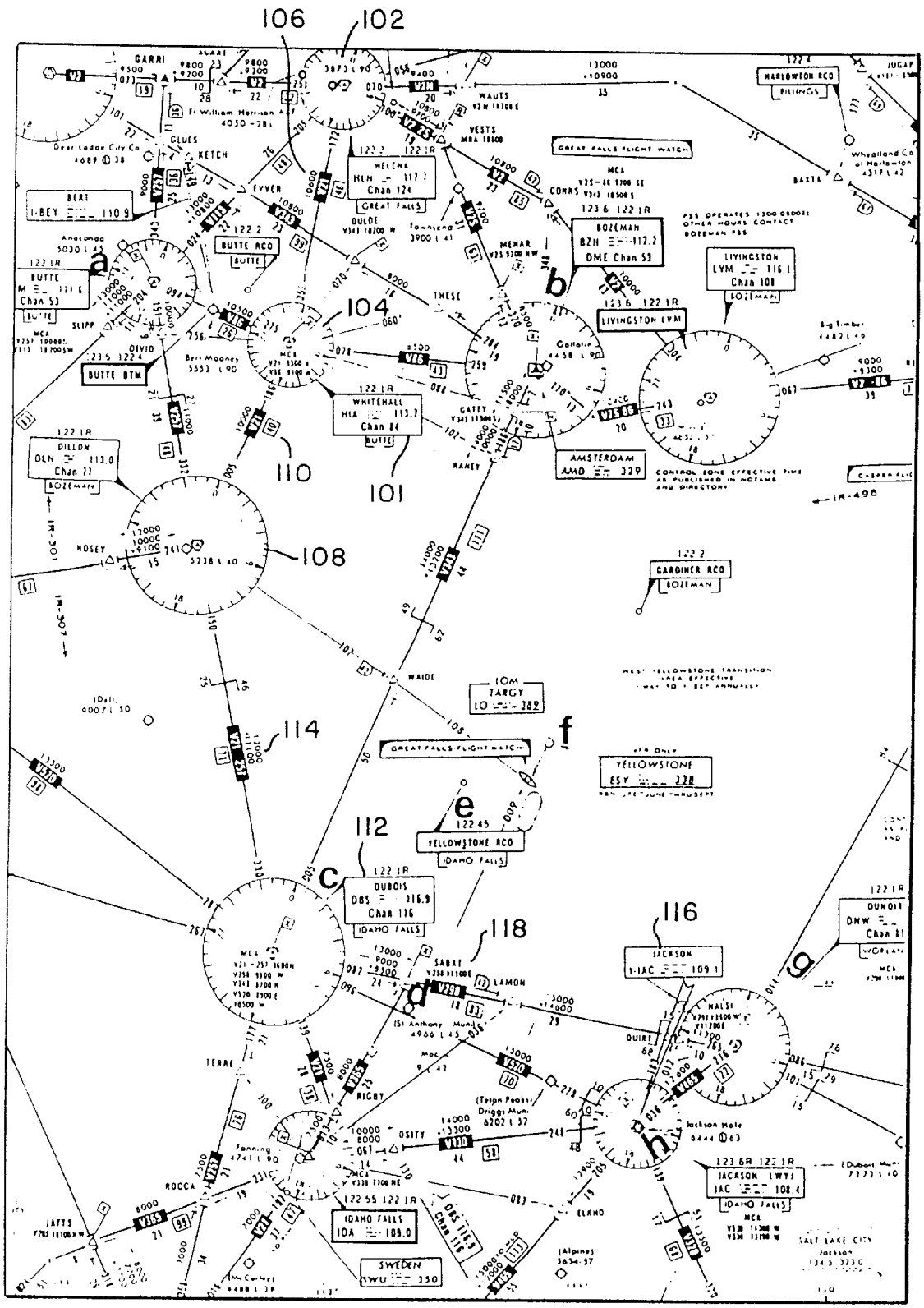
FIG. 1 is a Prior Art radio navigation en route navigation chart.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "calculating", "accessing", "retrieving" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 2:
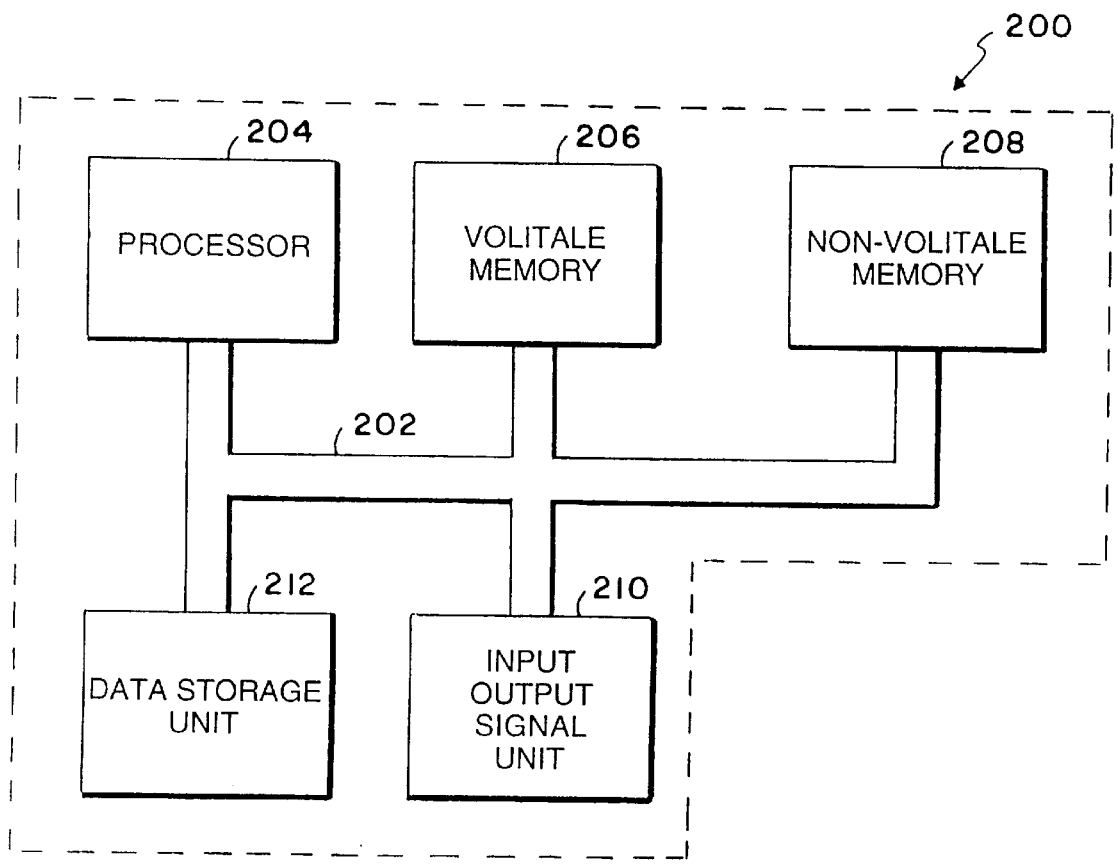
FIG. 2 is a logical representation of an exemplary computer system used as a part of a radio-navaid emulating GPS navigation system in accordance with the present invention.

With reference now to FIG. 2, portions of the present invention are comprised of computer executable instructions which reside in a computer system. FIG. 2 illustrates an exemplary computer system 200 used as a part of a radio navigation emulating GPS based navigation system in accordance with the present invention. Computer system 200 of FIG. 2 includes an address/data bus 202 for communicating information, a processor 204 coupled to bus 202 for processing information and instructions. Computer system 200 also incudes data storage devices such as computer readable volatile memory unit 206 (e.g., RAM memory), and a computer readable non-volatile memory unit 208 (e.g., ROM, EPROM, EEPROM, PROM, flash memory, programmed antifuses, etc.). Both volatile memory unit 206 and non-volatile memory unit 208 are coupled to bus 202. An optional input/output signal unit 210 and another computer readable data storage unit 212 (e.g., a high capacity magnetic and/or optical disk drive) are both coupled to bus 202. Input/output signal unit 210 allows bus 202 to communicate externally with other devices. Procedures of the present invention, described below, are implemented as program code stored within the above referenced computer readable memories and executed by processor 204.

General Description of the of the Present Invention

Figure 3:
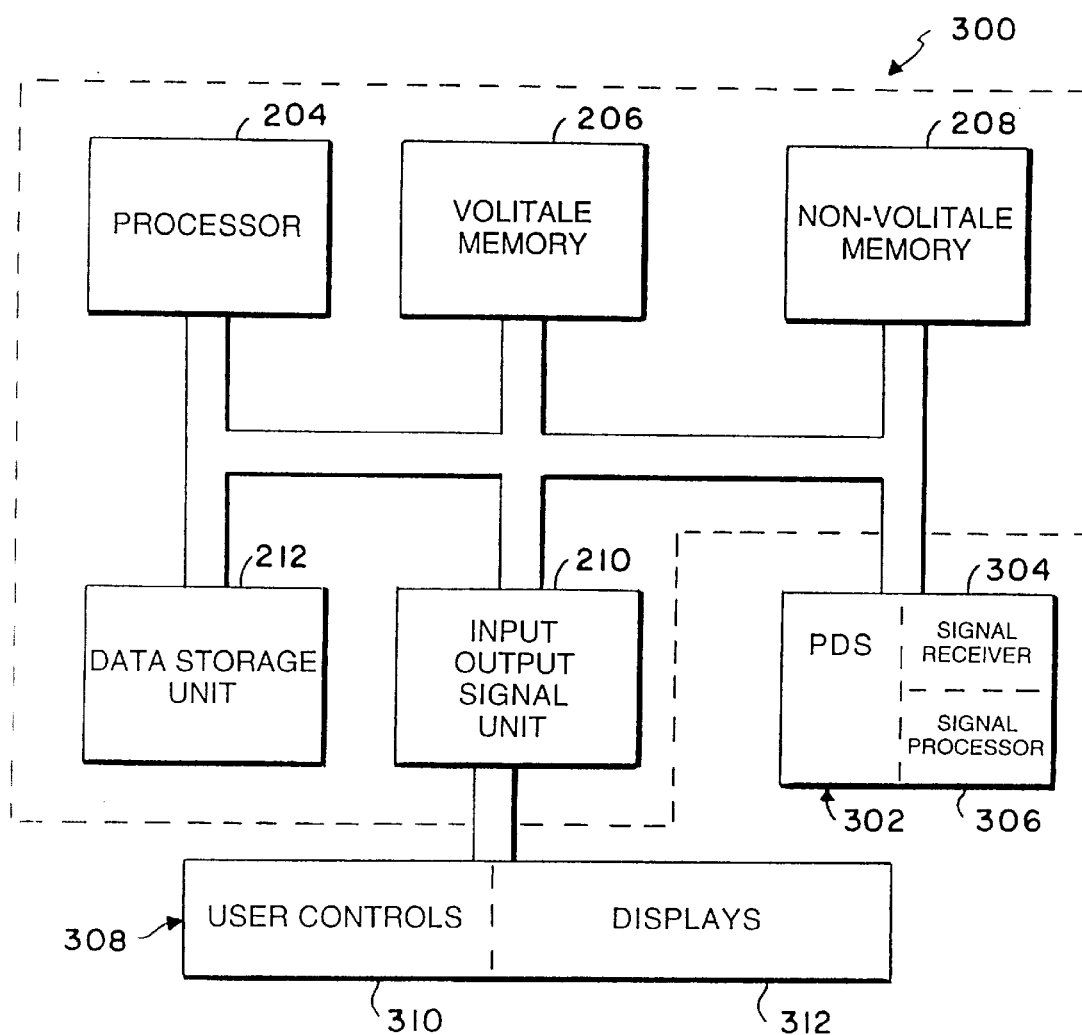
FIG. 3 is a logical diagram of a radio-navaid emulating GPS navigation system in accordance with the present claimed invention.

With reference now to FIG. 3, a logical diagram 300 illustrating one embodiment of the present invention is shown. A position determining system (PDS) 300, including a signal receiver 304 and a signal processor 306, is coupled to computer system 200. Signal receiver 304 receives position information signals and transfers the position information signals to signal processor 306. Signal processor 306 then generates position information indicative of the location of the aircraft. Position determining system 302 generates position information indicating, for example, the latitude, longitude, altitude, and velocity of an aircraft. Position determining system 302 also accurately determines the time at which the aircraft is at a specific location. It will be understood by those of ordinary skill in the art that numerous other well known features are not shown for purposes of clarity. Such well known features include but are not limited to, processing logic, user controls, power circuitry, and the like. In the present invention, position determining system 302 is, for example, a satellite-based radio navigation system. Satellite-based radio navigation systems such as the Global Positioning System (GPS), the Global Orbiting Navigational System (GLONASS), and the like are well suited for use with the present invention. Additionally, the present; invention is also well suited to recording GPS ephemeris data. The present invention is also well suited to being used in conjunction with improved position determining accuracy provided by the impending wide area augmentation system (WAAS).

The present invention further includes a radio navigation emulating user interface 308. In the present embodiment, radio navigation emulating user interface 308 includes user controls 310 and displays 312. User controls 310 and displays 312, of the present embodiment, have the same or similar design and operation parameters as standard radio navigation user controls and displays. A detailed description of user controls 310 and displays 312 is given below.

Figure 4:
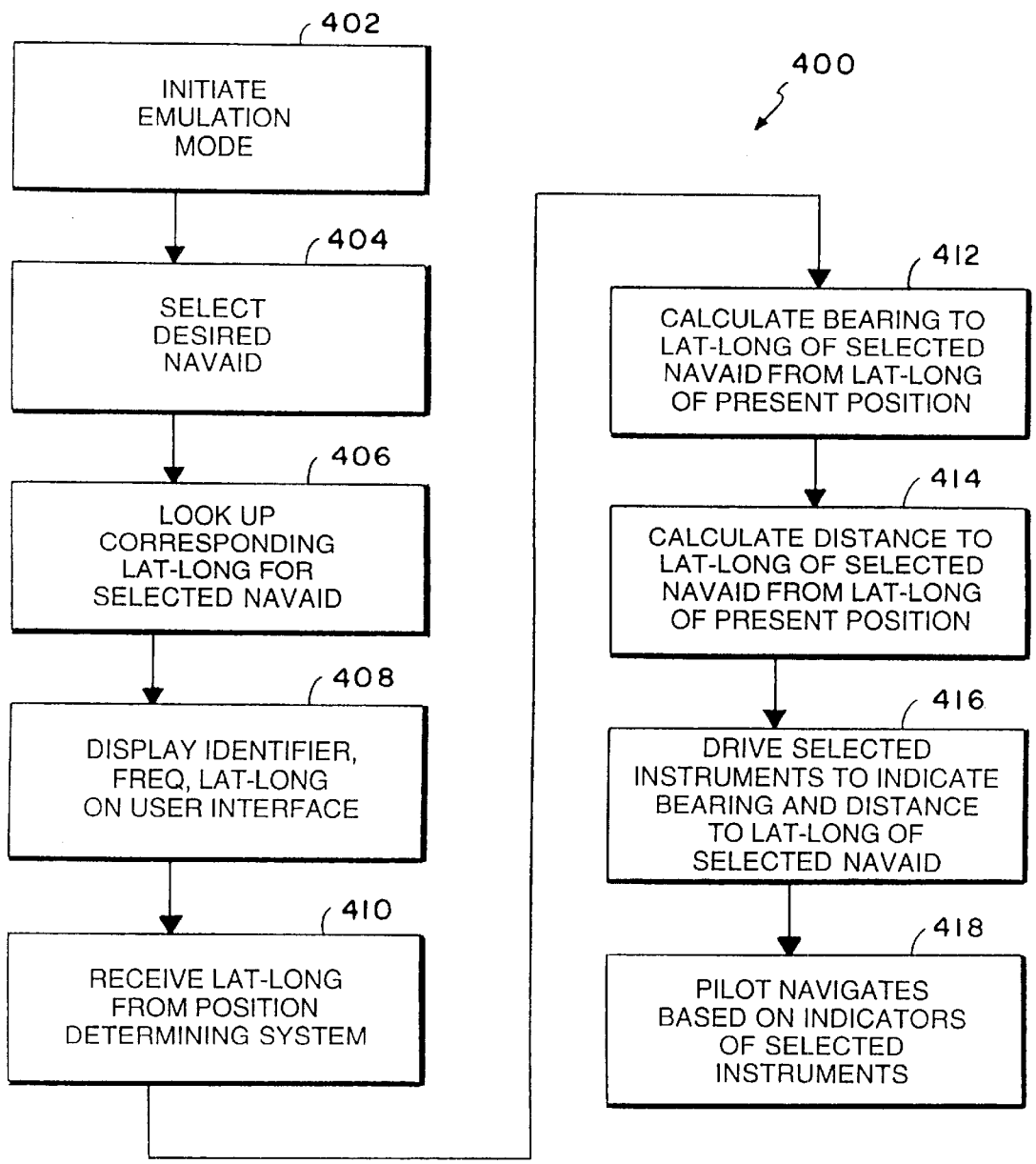
FIG. 4 is a schematic diagram of steps performed in accordance with the present claimed invention.

With reference next to FIG. 4, a schematic diagram 400 of steps performed by the present invention is shown. As shown in step 402 of FIG. 4 a pilot or user initiates the present invention by activating an emulation mode button of user controls 310 of FIG. 3. The activation of emulation mode overrides standard radio navigation functions and instead uses satellite signals but in a manner which emulates the operation of a radio navigation device. That is, in the present embodiment, the present invention is able to function as a standard radio navigation instrument or a satellite based navigation instrument. The present invention is also well suited to operating as a standard satellite based navigation system until the emulation mode is activated. In such an embodiment, once the emulation mode is activated, the present invention continues to use satellite signals but in a manner which emulates the operation of a radio navigation device.

Next, as shown in step 404, after activating emulation mode, the pilot selects the desired navaid (e.g. a VOR, TACAN, DME, and the like) by tuning or entering the frequency associated with the navaid into the present system. Such entries are typically made when the pilot is planning the flight route. The present invention is also well suited to having the navaids entered at various other times as well. Additionally, the following discussion relates to a VOR emulation mode, however, the present invention is also well suited to operating under a VORTAC, TACAN, VOR/DME, NDB, or any other conventional navaid emulation mode. The present invention is also well suited to having the pilot enter other navaid identifying information such as the three letter identifier associated with most ground based navaids. Likewise, the present invention is well suited to allowing the pilot to enter a waypoint, landmark, other destination. It is anticipated that in the future, GPS only approaches will be defined by a waypoint. In such an instance, the present invention is also allows that waypoint to be selected by the pilot so that the landing approach will be flown as though it were a VOR approach.

In step 406, processor 204 of FIG. 3 retrieves latitude and longitude information (lat-long) corresponding to the selected navaid. That is, the present invention accesses stored information to find the precise lat-long of the navaid whose frequency or three letter identifier the user selected. Position information for navaids is stored, for example, in data storage unit 212, volatile memory 206, or non volatile memory 208, all of FIG. 3. In the present embodiment, the present invention contains an internal database of 1000 user waypoints and 100 flight plans. The present invention is also well suited to accessing navaid information coupled to system 300 via a portable memory devices such as a CD ROM, a PCMCIA card, and the like. In the present embodiment, the present invention accommodates portable memory devices such as, for example, data cards with a capacity of up to 16 megabytes. The present invention further accommodate a data card with both read and write capabilities. The data cards are used to update the present radio navigation emulating GPS system with regard to facilities, navaids, approaches, and the like, in the specific area of interest in which the pilot is flying. The present embodiment further allows the user to extract and reinsert the data card while the present invention is powered, without affecting the system.

Thus, although the pilot tunes or selects a ground based transmitter when using the present invention, the pilot is actually selecting a virtual station. When in emulation mode, instead of actually tuning in the frequency entered by the pilot, the present invention determines the lat-long information of the selected navaid. Therefore, the pilot operates the controls of the present invention in the same manner as a pilot would operate a radio navigation device. As a result, to the pilot, the present invention appears to be functioning the same as a radio navigation system functions. In an embodiment, in which the pilot enters a waypoint or landmark not having a conventional radio navaid associated therewith, the present invention further contains lat-long information corresponding to the waypoint or landmark.

Referring now to step 408, in the present embodiment, a display 312 of the present invention will also display the letters identifying the station having the selected frequency. Additionally, the present embodiment also displays the lat-long of the selected navaid. Although such information is displayed in the present embodiment, the present invention is also well suited, for example, to displaying only, information typically displayed by conventional radio navigation systems.

At step 410, processor 204 accesses the present position information provided by position determining system 302 of FIG. 3. The position information includes the precise current lat-long of the aircraft. Position determining system 302 is also able to generate velocity information for the aircraft. Velocity information is obtained by measuring the Doppler shift of signals between position determining system 10 and at least one satellite. Additionally, position determining system 302 is able to very accurately determine the time at which the aircraft is at any specific location.

In step 412 of FIG. 4, processor 204 of the present invention uses the position information to calculate the bearing to the selected navaid from the present location of the aircraft. The bearing pointer will indicate exact bearing to the navaid selected by the pilot. Thus, the present invention calculates the bearing from the precise lat-long of the aircraft to the precise lat-long of selected navaid. Thus, the present invention provides satellite based accuracy levels in what appears to the pilot to be a radio navigation system. As yet another advantage, the present invention does not have the inherent range limitations associated with prior art radio navigation systems. That is, the present invention compares the lat-long of the navaid with the lat-long of the aircraft to indicate the bearing from the aircraft to the navaid. The present invention eliminates the need to receive radio signals from the navaid before a bearing can be calculated. Hence, the present invention is not limited by the radio signal range of a navaid. As mentioned above, most radio navaids are limited to a maximum range of approximately 130 nautical miles. The range of the present invention is not limited. Therefore, the present invention can accurately provide a bearing from the aircraft to a navaid located well beyond the range of radio signals. Consequently, the present invention provides direct routing over an unlimited distance. Thus, the benefit of direct routing will be retained in a system which appears to the pilot to be a radio navigation based system. All of the aforementioned benefits are realized without requiring retraining of the pilot.

As shown in step 414, processor 204 calculates the distance to the selected navaid from the present location of the aircraft. More specifically, the present invention calculates the distance from the precise lat-long of the aircraft to the precise lat-long of selected navaid. If one embodiment, the distance to the selected navaid is displayed on displays 312 of FIG. 3. Thus, the present invention provides satellite based accuracy levels in what appears to the pilot to be a radio navigation system. Again, the present invention does not have the inherent range limitations associated with prior art radio navigation systems. That is, the present invention compares the lat-long of the navaid with the lat-long of the aircraft to indicate the distance from the aircraft to the navaid. The present invention eliminates the need to receive radio signals from the navaid before a distance can be calculated. Hence, the present invention is not limited by the radio signal range of a navaid. As mentioned above, the benefit of direct routing will be retained in a system which appears to the pilot to be a radio navigation based system, and no retraining of the pilot is required. As an additional advantage, the distance calculating ability of the present invention allows an NDB approach to be flown as though the NDB were a VOR station.

As shown in steps 416 and 418, in emulation mode, the present invention drives conventional radio navigation displays. The pilot then uses the conventional displays and gauges to navigate the aircraft. Thus, the present invention allows pilots to navigate using conventional instrument flight rules (IFR) instrumentation but with a level of accuracy and precision not found in conventional radio navigation systems. Hence the present invention greatly enhances the situational awareness of the uncomfortable or task saturated pilot. The present invention, when in emulation mode, will be safer than the conventional radio navigation only receivers. The improved safety results, in part, because the present invention is far more accurate than radio navigation receivers and because the present invention is not subject to range and line-of-sight limitations associated with ground based radio navaid transmitters. Additionally, by allowing the pilot to navigate and fly a direct, straight line path to a point hundreds of miles away, the present invention reduces the number of times navigation information must be3 entered by the pilot. Thus, the present invention reduces the chances for erroneous navaid entries or selections. Finally, should a pilot feel uncomfortable, for any reason, while operating the present invention in emulation mode, emulation mode can readily be deactivated thereby placing the system back in standard radio navigation or GPS mode.

As yet another benefit, the availability of emulation mode will ease the transition of current pilots into the operational characteristics of GPS receivers. Pilots will be able to learn and experience the new capabilities of the present invention at their own pace. Pilots will gain familiarity and comfort with the GPS features of the present invention as they use it inflight. Pilots will not have to fear entering congested flying areas or flying through bad weather IFR conditions without being completely and totally familiar with all GPS features and controls of the present invention. At any time in flight, the ease of use and familiarity of conventional navaids will be available to the task saturated pilot. Thus, a pilot will be able to purchase the present invention, have it installed in an aircraft, and be able to safely and competently fly the aircraft, without any formalized expensive training whatsoever.

Furthermore, the present invention is fully compliant with all current TSO-C129 requirements. TSO-C129 is a standard imposed on the aviation community by the Federal Aviation Administration (FAA). All avionics components must comply with the TSO-C129 standard before the FAA will approve the use of the components. The exact specifications of the TSO-C129 standard are well known in the aviation community.

As yet another advantage, the present invention is also well suited to use with receiver autonomous integrity monitoring (RAIM) algorithms. In GPS receivers, RAIM algorithms perform an independent check of the validity of a GPS position fix. Such validity checks are necessary to insure that air navigation using GPS signals can safely occur. If the RAIM algorithm determines that the GPS signal reliability falls beneath a predetermined threshold, the present invention sounds an alarm. Upon hearing or seeing the alarm, a user of the present invention knows that conventional navaids must be used for navigation.

Detailed Description of User Controls and Displays

Figure 5A:
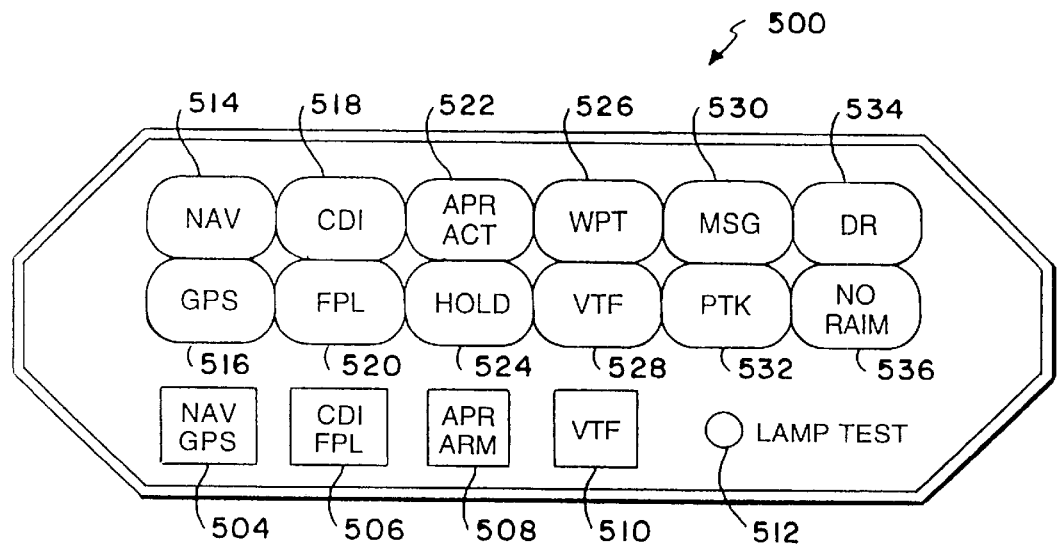
FIGS. 5A and 5B illustrate an annunciator panel and an instrument front panel, respectively, in accordance with the present claimed invention.
Figure 5B:
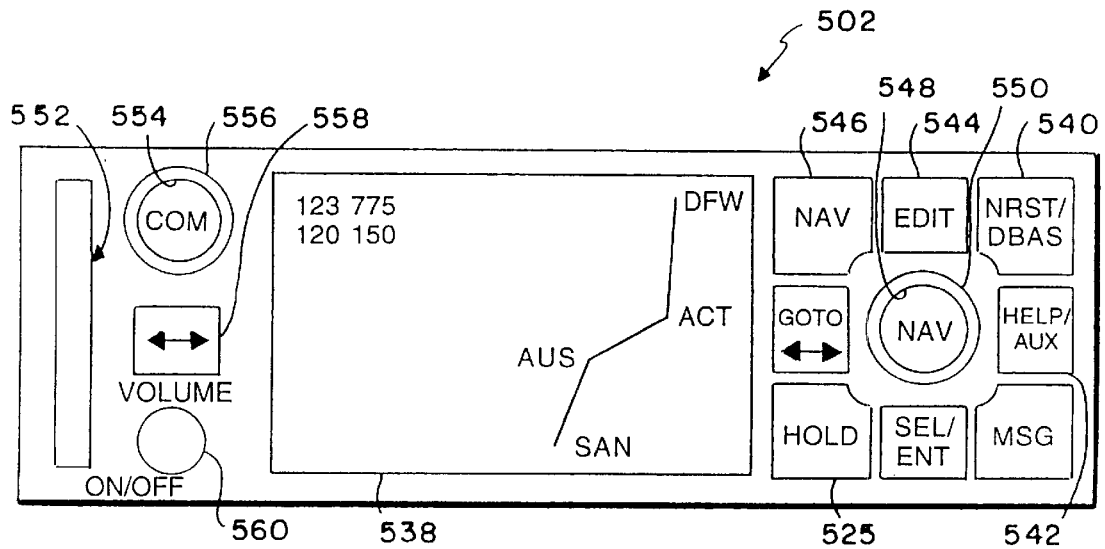

FIGS. 5A and 5B illustrate an exemplary annunciator panel 500 and an exemplary instrument front panel 502, respectively, used by the present radio navigation emulating GPS system. It will be understood by those of ordinary skill in the art that the present invention is well suited to numerous variations in the layout of an exemplary annunciator panel 500 and an exemplary front panel 502.

With reference again to FIG. 5A, annunciator panel 500 has a plurality of switches and buttons. A description of exemplary switches and buttons in the present radio navigation emulating GPS system is given below. Again, it will be understood by those of ordinary skill in the art that the present invention is also well suited to numerous variations in the layout, function, and type of switches and buttons used in the present invention.

NAV/GPS 504 is an alternate action switch which will select either radio navigation (NAV) or GPS information to drive an external CDI, a horizontal situation indicator (HSI), or a moving map. In the present embodiment, NAV/GPS 504 is backlit. If NAV is selected, external radio navigation signals are used to compute the navigation data. If GPS is selected, GPS information is used to compute navigation data.

CDI/FPL 506 is a momentary switch which is used to toggle between Emulation mode and flight plan mode. Flight plan mode is used to program waypoints for navigation. Emulation mode immediately switches the display to navigation data. In the present embodiment, CDI/FPL 506 switch is backlit.

APR/ARM 508 is a switch which is used for an approach. APR/ARM 508 flashes when an approach can be armed. After the approach has been armed, APR/ARM 508 will be lit continuously. If no approach is selected or the approach cannot be armed, APR/ARM 508 is not backlit. When an approach is armed the present invention automatically sequences its display to show approach information when the initial approach point is reached. The approach can be armed when the present navigation system determines that the approach may be safely flown.

VTF 510 is an alternate action switch which switches the present invention between flight plan approach mode and Vector-To-Final approach mode. VTF 510 is backlit continuously whenever an approach has been armed (and can therefore be switched into VTF mode). In Vector-to-Final the navigator will indicate navigation data to the final approach point of an approach.

LAMP TEST 512 is a momentary switch which tests all indicators and lights. LAMP TEST 512 is used to insure that all annunciator panel lamps are functioning properly. When LAMP TEST 512 is depressed all lights and indicators illuminate momentarily.

With reference again to FIG. 5A, annunciator panel 500 has a plurality of annunciators/indicator lights. A description of the exemplary annunciators in the present radio navigation emulating GPS system is given below. Again, it will be understood by those of ordinary skill in the art that the present invention is also well suited to numerous variations in the layout, function, and type of annunciators used in the present invention.

NAV 514 indicates that currently, the CDI, HSI, or moving map is displaying information from an external Nav or Nav/Comm radio. This annunciator is driven directly from the NAV/GPS switch. It tells the pilot what source the CDI, HSI, or radio magnetic indicator (RMI) is using to generate their navigation indications. If NAV 514 is lit, a non-GPS source is selected (external navaid).

GPS 516 indicates that currently, the CDI, HSI, or moving map is displaying GPS derived information. This annunciator is driven directly from NAV/GPS switch 504. If GPS is lit, GPS derived position information is selected.

CDI 518 indicates that the present invention is in VOR Emulation mode.

FPL 520 indicates that currently, the present invention is in flight plan mode.

APR/ACT 522 indicates that the approach mode is active. The approach mode is active, for example, during the period of time when the aircraft is within 2 nautical miles from a final approach fix until the aircraft is landed or until the approach is canceled. When the approach mode is active, the present invention is providing approach information to the pilot.

HOLD 524 indicates that the present radio navigation emulating GPS system is providing guidance for flying the aircraft through a holding pattern. HOLD 525 is illuminated when the pilot selects HOLD button 525 on the front panel 502 of FIG. 5B. The pilot then flies the hold pattern indicated by the present invention.

WPT 526 indicates that the aircraft is close to the current "TO" waypoint. This warns the pilot that the Navigator will soon switch to the next waypoint in the flight plan.

VTF 528 indicates that the present radio navigation Emulating GPS system is in Vector-To-Final mode. VTF 528 is driven directly by VTF switch 510.

MSG 530 indicates that a new message is available on the present radio navigation emulating GPS system. Messages from the present invention may indicate system status, waypoint information, navaid information, or other information requiring the pilot's attention.

PTK 532 indicates that an offset track has been selected on the present radio navigation emulating GPS system.

DR 534 indicates that the present radio navigation emulating GPS system is in Dead Reckoning mode. Dead Reckoning refers to determining position using only heading, time, and speed.

NO RAIM 536 indicates that the present radio navigation emulating GPS system has lost the capability for integrity monitoring. RAIM is a TSO-C129 requirement standard for monitoring the integrity of GPS satellite signals.

With reference next to FIG. 5B, front panel 502 has a graphics-capable multi-function display 538, and plurality of control knobs and buttons. A description of the exemplary graphics-capable multi-function display, and plurality of control knobs and buttons of the present radio navigation emulating GPS system is given below. Again, it will be understood by those of ordinary skill in the art that the present invention is also well suited to having numerous variations in the layout, function, and type of graphics-capable multi-function display, and plurality of control knobs and buttons used in the present invention.

As shown in FIG. 5B, the center of front panel 502 includes a graphics-capable multi-function display 538. The controls to the right of graphics-capable multi-function display 538 are used for navigation functions. The controls to the left of graphics-capable multi-function display 538 are used to control a communications radio. Although a communication radio is shown in the present embodiment, the present invention is also well suited to not having a communications radio integral therewith. The functions of the control knobs and buttons depends on the selected mode of the present invention.

When using any of the functions provided by depressing the NRST/DBAS 540, HELP/AUX 542, and EDIT 544 keys, pushing the NAV 546 key returns the graphics-capable multi-function display 538 to the NAV page format, without accepting any changes or inputs made to an active or standby waypoint. The NAV page format typically displays navigation information for a current route to the pilot. The present invention displays the following information on graphics-capable multi-function display 538 when in the NAV page format:

Active "VOR frequency or NDB frequency

Active fix identifier;

Standby "VOR frequency" or "NDB frequency;

Standby fix identifier;

Distance to active fix (similar to DME distance);

Bearing to active fix;

ETA to active fix;

Distance to standby fix (similar to DME distance).

The navigation information displayed in the present embodiment is the standard configuration used in most radio navigation systems. As such, the present embodiment provides information in a manner which is familiar to most pilots. Using graphics-capable multi-function display 538 the present invention is able to emulate any conventional navaid.

When the unit is displaying the NAV page, the two concentric knobs NAV 548 and NAV 550 to the left of the graphics-capable multi-function display 538, are used to edit the standby information selected navaids. Knobs NAV 548 and NAV 550 are used to tune or select, for example, a VOR or NDB frequency or a fix identifier. When the present invention is in VOR emulation mode, to select a VOR frequency, NAV 550 is used to tune the standby VOR frequency. NAV 548 used to tune the 100 kHz and 10 kHz digits. Likewise, when the present invention is in NDB emulation mode, NAV 550 is used to tune the standby NDB frequency 100 kHz digit. NAV 548 is used to tune the 10 kHz and 1 kHz digits. As far as the user is concerned, tuning of the present invention is handled the same as tuning of a radio navigation based system. If no lat-long information is found corresponding to the selected navaid, the present invention displays dashes on all fields relating to the standby fix on graphics-capable multi-function display 538. Slot 552 is adapted to receive a portable memory device such as a CD ROM, a PCMCIA card, and the like. The portable memory device is used to update the present radio navigation emulating GPS system with regard to facilities, navaids, approaches, and the like, in the specific area of interest in which the pilot is flying.

Thus, the present invention achieves all emulation modes using a standard configuration on graphics-capable multi-function display 538. The pilot selects the desired emulation mode through manipulation of the controls described above. The present invention communicates between front panel 502 and annunciator panel 500 using discrete inputs. The inputs, in turn, inform the pilot of status of the present invention and provide indications as to the present invention's current mode. Thus, the present radio navigation emulating GPS system provides the pilot with the full features of highly accurate GPS navigation, and provides the comfort and security of conventional radio navaid emulation at the touch of a button. Thus, the present invention allows pilots to filly utilize the features and advantages of GPS navigation without requiring that the pilot spend an inordinate amount of time head down, as opposed to being head up and flying the airplane. The present invention further minimizes up-front training costs as the most pilots are already familiar which the type of operation emulated by the present invention. Additionally, the present invention achieves the accuracy of GPS and greatly improves the standard methods of conventional navaid navigation. A pilot will have GPS accuracy and flexibility while operating the present invention as though it were a conventional, and much less accurate, radio navaid.

With reference still to FIG. 5B, two concentric knobs COM 554 and COM 556 to the left of graphics-capable multi-function display 538 are used solely to edit the communications (comm) radio standby frequency. COM 556 is used to change the MHz and 10 MHz digits, and COM 554 is used to change the 10 kHz and 100 kHz digits. Button 558 marked "<—>" to the left of graphics-capable multi-function display 538 and under knobs COM 554 and COM 556, is used to swap standby and active frequencies in the comm radio. This allows the pilot to switch between approach control and tower, for instance. The comm radio of the present invention further includes a volume and on/off control 560.

The present invention also displays the position of the aircraft with respect to selected bearing using a course deviation indicator (CDI) 600 shown in FIG. 6. A CDI is a common cockpit navigation display device in use today. All pilots familiar with radio navigation are familiar with the use of a standalone CDI 600, or a combination CDI such as a CDI/HSI (horizontal situation indicator) 700 as shown in FIG. 7. That is, once emulation mode is activated, the present invention will emulate the use of a radio navigation based system and display the relative location of the aircraft; with respect to a selected route on, for example, CDI/HSI 700. In addition, in the present embodiment, the present invention can also provide a constant read out of distance from the selected navaid, in the same manner a conventional DME receiver does today. Thus, the end user will receive information that emulates, for example, both a VOR receiver and a DME receiver.

Figure 8:
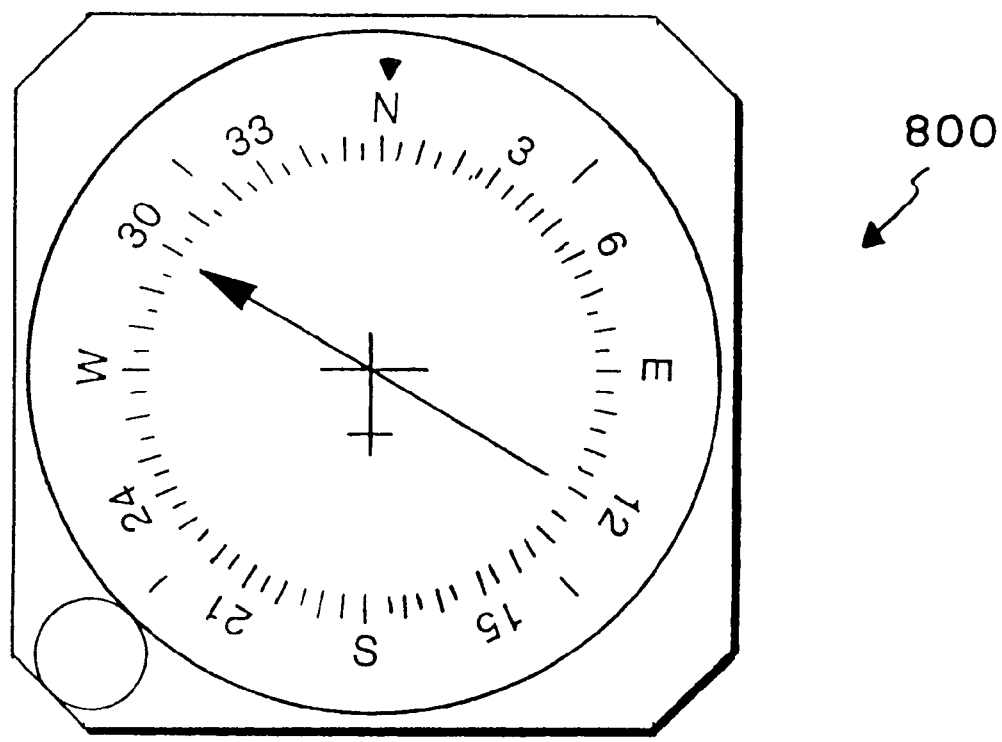
FIG. 8 is an illustration of an ADF gauge which is driven by a radio-navaid emulating GPS navigation system in accordance with the present claimed invention.

With reference next to FIG. 8, when emulating an NDB radio navigation system, the present invention also emulates NDB indications on an automatic direction finder (ADF) 800. When emulating other radio navaids, the present invention emulates the respective radio navaid indications on ADF 800 when appropriate.

The entire emulation process achieved by the present invention is transparent to the pilot. Emulation mode will be easily accessible and intuitively obvious in its operation. When the emulation mode is de-activated, the present invention instantly switches to conventional radio navaid operation.

Thus, the present invention provides a navigation device which eliminates the errors associated with radio navigation systems and provides GPS level accuracy. The present invention also provides a uniform and standardized navigation instrumentation for use with a navigation system providing GPS level accuracy. As yet another advantage, the present invention also provides a navigation instrumentation which operates with GPS level accuracy and which the pilot community will not be reluctant to adopt.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An aircraft navigation apparatus comprising:
   a GPS receiver for generating GPS based position information; and
   a radio navaid emulating device coupled to the GPS receiver to receive the position information, the radio navaid emulating device configure to use the positioning information to generate emulated radio navaid guidance indications and presenting the indications without using a map mode or plan mode on a display.

2. In a computer system, a method of emulating a conventional radio navigation system while using satellite based position information, the method comprising the computer implemented steps of:
   receiving an identifier associated with a conventional navaid;
   retrieving coordinates corresponding to a location of the conventional navaid;
   generating satellite based position information for an aircraft;
   generating navigation information for the aircraft using the location of the conventional navaid and the satellite based position information for the aircraft; and
   presenting the navigation information in a manner which emulates the presentation of navigation information generated by a conventional radio navigation device without using a map mode or plan mode on a display.

3. A computer system comprising:
   a processor;
   an address/data bus coupled to the processor;
   a satellite based position determining system coupled to communicate with the processor;

a computer readable memory coupled to communicate with the processor, the processor for performing steps of:

receiving an identifier associated with a conventional navaid;

retrieving coordinates corresponding to a location of the conventional navaid;

generating satellite based position information for in aircraft;

generating navigation information for the aircraft using the location of the conventional navaid and the satellite based position information for the aircraft; and presenting the navigation information including indications in a manner which emulates the presentation of navigation information generated by a conventional radio navigation device and presenting the indications without using a map mode or plan mode on a display.

4. The aircraft navigation apparatus of claim 1 wherein the GPS receiver is a differential GPS receiver.

5. The aircraft navigation apparatus of claim 1 wherein the radio navaid emulating device is configured to emulate a conventional radio navaid device user interface.

6. The aircraft navigation apparatus of claim 1 wherein the emulated conventional radio navaid device user interface includes user controls substantially similar to user controls of a conventional radio signal based aircraft navigation system.

7. The aircraft navigation apparatus of claim 1 wherein the radio navaid emulating user interface emulates a VOR aircraft navigation system.

8. The aircraft navigation apparatus of claim 6 wherein the radio navaid emulating user interface emulates a DME aircraft navigation system.

9. The aircraft navigation apparatus of claim 6 wherein the radio navaid emulating user interface emulates a TACAN aircraft navigation system.

10. The aircraft navigation apparatus of claim 6 wherein the radio navaid emulating user interface emulates an NDB aircraft navigation system.

11. The method as recited in claim 2 further comprising the computer implemented step of:

retrieving the coordinates corresponding to the location of the conventional navaid from a data storage unit.

12. The method as recited in claim 2 further comprising the computer implemented step of:

retrieving the coordinates corresponding to the location of the conventional navaid from a portable memory device.

13. The method as recited in claim 2 further comprising the computer implemented steps of:

calculating the bearing of the aircraft with respect to the received conventional navaid, and displaying the bearing in a manner which emulates the presentation of navigation information generated by a conventional radio navigation device.

14. The method as recited in claim 2 further comprising the computer implemented steps of:

calculating the distance of the aircraft from the received conventional navaid; and displaying the bearing in a manner which emulates the presentation of navigation information generated by a conventional radio navigation device.

15. The method as recited in claim 2 wherein the radio navaid emulating user interface emulates a VOR aircraft navigation system.

16. The method as recited in claim 2 wherein the radio navaid emulating user interface emulates a DME aircraft navigation system.

17. The method as recited in claim 2 wherein the radio navaid emulating user interface emulates a TACAN aircraft navigation system.

18. The method as recited in claim 2 wherein the radio navaid emulating user interface emulates an NDB aircraft navigation system.

19. The system as recited in claim 3 wherein the processor further performs the steps of:

retrieving the coordinates corresponding to the location of the conventional navaid from a data storage unit.

20. The system as recited in claim 3 wherein the processor further performs the steps of:

retrieving the coordinates corresponding to the location of the conventional navaid from a portable memory device.

21. The system as recited in claim 3 wherein the processor further performs the steps of:

calculating the bearing of the aircraft with respect to the received conventional navaid, and displaying the bearing in a manner which emulates the presentation of navigation information generated by a conventional radio navigation device.

22. The system as recited in claim 3 wherein the processor further performs the steps of:

calculating the distance of the aircraft from the received conventional navaid; and displaying the bearing in a manner which emulates the presentation of navigation information generated by a conventional radio navigation device.

23. The system of claim 3 wherein the presentation of navigation information emulates a VOR aircraft navigation system.

24. The system of claim 3 wherein the presentation of navigation information emulates a DME aircraft navigation system.

25. The system of claim 3 wherein the presentation of navigation information emulates a TACAN aircraft navigation system.

26. The system of claim 3 wherein the presentation of navigation information emulates an NDB aircraft navigation system.

* * * * *